United States Patent [19]

Riggs

[11] 4,170,504
[45] Oct. 9, 1979

[54] TIRE BUILDING ACCESSORY

[75] Inventor: Robert S. Riggs, Stow, Ohio

[73] Assignee: The Goodyear Tire & Rubber Company, Akron, Ohio

[21] Appl. No.: 871,674

[22] Filed: Jan. 23, 1978

Related U.S. Application Data

[63] Continuation of Ser. No. 718,657, Aug. 30, 1976, abandoned, which is a continuation of Ser. No. 516,249, Oct. 21, 1974, abandoned.

[51] Int. Cl.$^2$ .......................................... B29H 17/20
[52] U.S. Cl. ........................... 156/123 R; 156/405 R; 242/55; 242/57.1; 242/DIG. 2
[58] Field of Search ...................... 242/54, 55, DIG. 2, 242/158 R, 158.4 R, 57.1, 78, 78.6, 67.3 R, 58.6, 158.2; 156/110, 117, 123, 394, 397, 405, 406, 187, 194, 195

[56] References Cited

U.S. PATENT DOCUMENTS

| | | | |
|---|---|---|---|
| 652,893 | 7/1900 | Herdman | 242/158.2 |
| 1,349,390 | 8/1920 | Swinehart | 156/117 |
| 1,611,400 | 12/1926 | Andrews | 242/55 |
| 2,998,692 | 9/1961 | Garner | 242/54 R |
| 3,523,854 | 8/1970 | Cantarutti | 156/397 |
| 3,623,677 | 11/1971 | Appleby | 242/67.3 |
| 3,717,536 | 2/1973 | McVag et al. | 156/463 |
| 3,779,480 | 12/1973 | Cambou | 242/158 R |
| 3,836,086 | 9/1974 | Kodama | 242/35.5 R |
| 3,877,655 | 4/1975 | Cardinal et al. | 242/67.1 R |

Primary Examiner—John E. Kittle
Attorney, Agent, or Firm—R. S. Washburn

[57] ABSTRACT

A spool with enhanced capacity for narrow strip components of tires for use in building tires is provided by winding such strip together with a cloth strip in successive alternating helical layers. A method for preparing such spool and a method for dispensing strip therefrom to a tire building machine are also disclosed.

The foregoing abstract is not to be taken as limiting the invention of this application, and in order to understand the full nature and extent of the technical disclosure of this application, reference must be made to the accompanying drawing and the following detailed description.

5 Claims, 5 Drawing Figures

U.S. Patent  Oct. 9, 1979  4,170,504
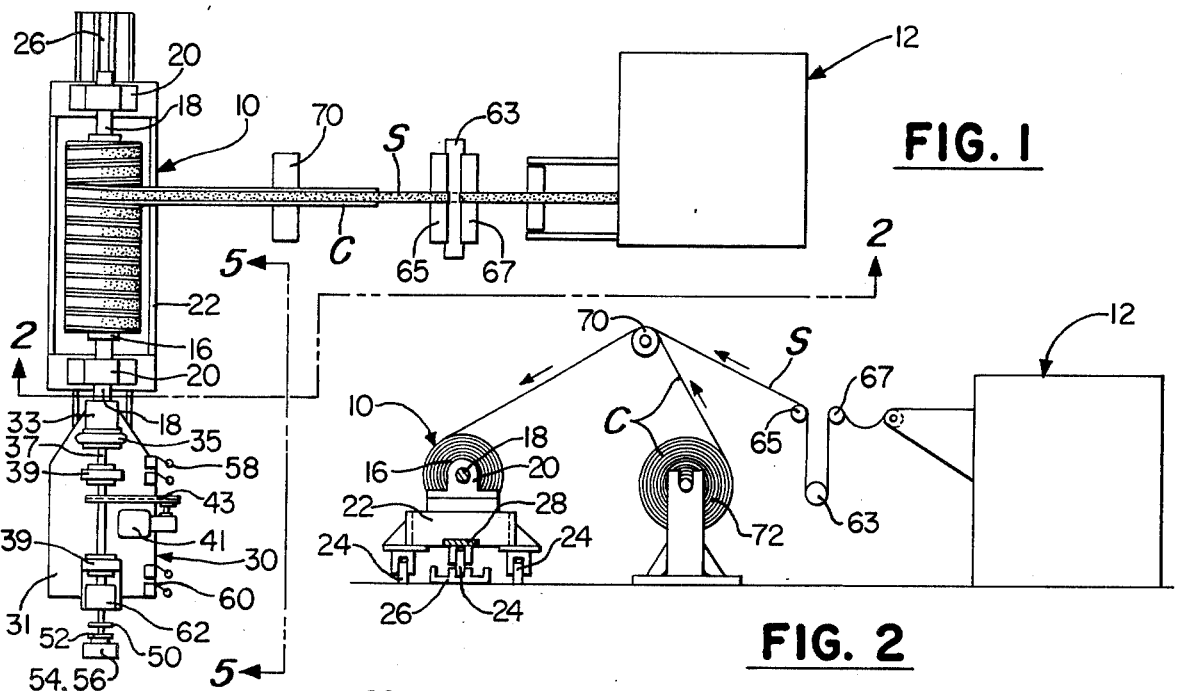
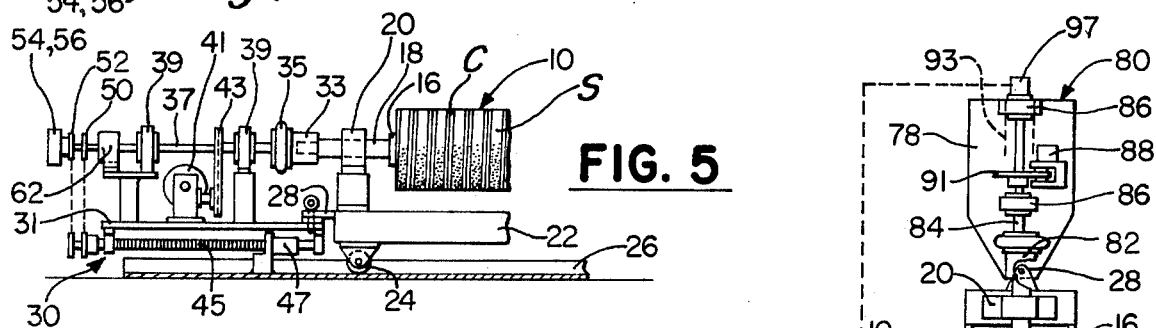
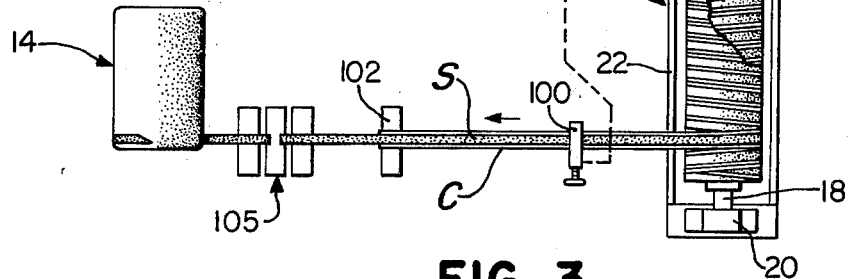
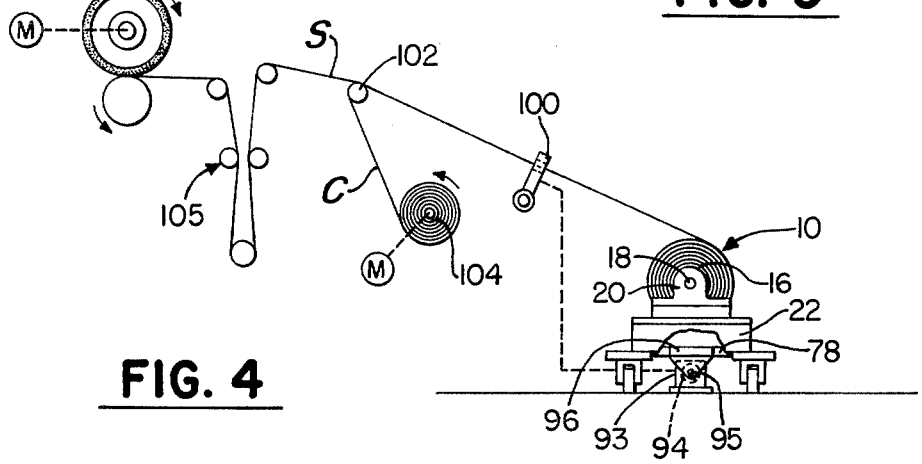

TIRE BUILDING ACCESSORY

This is a continuation of application Ser. No. 718,657 filed Aug. 30, 1976, now abandoned and which is a continuation of Ser. No. 516,249 filed Oct. 21, 1974, now also abandoned.

The present invention relates to building tires and particularly to delivery, from the point of preparation to the point of use, of narrow strip components of a tire at the tire building machine on which the tire is constructed.

In the manufacture of tires for motor vehicles and the like, a number of building components in the form of narrow strips are, for various known purposes, incorporated in the body of the tire in addition to the usual carcass plies, beads, and treads. Such narrow strips are well known. Representative examples thereof are commonly referred to as chippers, chafers, toe strips, apex strips, shoulder wedges, and the like. For brevity in the following description, such narrow strip components are referred to generally as strips.

Commonly heretofore such strips have been delivered from the point at which they are prepared to a point convenient to the tire builder who then applies them manually to the tire being built on a conventional building drum. Lengths of the strip are commonly delivered to the tire builder either in small rolls or precut and placed on trays. Such strips are commonly very tacky and difficult to handle.

A primary object of the invention is to improve the efficiency and economy in delivery of such strips. Further objects and advantages will become apparent from the following description.

Briefly, and in accordance with one aspect of the invention, there is provided a supply reel of tire building component strip comprising a truck having bearings and track wheels, a cylinder mounted rotatably on said bearings, a continuous running length of tire building strip and a continuous running length of non-adherent separator cloth, said strip and said cloth being in face-to-face contact and convolutely wound about said cylinder in a plurality of layers, the strips of each layer being arranged helically about the cylinder and reversed in helical lead in successive layers.

In a further aspect, the invention comprises a method of supplying a running length strip to a tire building machine which includes the steps of winding such strip together with a separator cloth about a rotatable cylinder, and traversing the cylinder to and fro along its own axis while rotating the cylinder to wind the strip in successive layers of opposite lead helices on the cylinder.

Yet an additional aspect of the invention provides a method of supplying a running length strip to a tire building machine from a supply reel comprising unwinding said strip while sensing lateral displacement of said strip with respect to the tire building machine, and traversing the supply reel parallel to the axis of the tire building machine in response to said lateral displacement to correct such lateral displacement.

To acquaint those skilled in the art with the principles of the invention and enable them to practice the same, certain preferred embodiments of the invention illustrating the best mode presently contemplated for putting the same into practice are described in the specification and by the attached drawings in which:

FIG. 1 is a synoptic plan view of the narrow strip supply reel according to the invention, receiving strip from strip preparation apparatus;

FIG. 2 is an elevation view of the arrangement of FIG. 1;

FIG. 3 is a synoptic plan view of the narrow strip supply reel of FIG. 1 arranged to deliver narrow strip therefrom to a tire building machine;

FIG. 4 is an elevation view of the arrangement of FIG. 3; and

FIG. 5 is an elevation view of a portion of the reel as seen from line 5—5 of FIG. 1.

In the drawing, the narrow strip supply reel according to the invention is illustrated at 10. In FIGS. 1 and 2, the reel 10 is shown in the process of being filled, that is, being wound with a strip being received from conventional apparatus 12 for preparing such strip. In FIGS. 3 and 4, the reel 10 is illustrated in operative association for delivering the strip therefrom to a tire building machine 14. The apparatus 12 can be, for example, a calender, an extruder, or a bias cutter-splicer, each of which is adaptable for preparing strips of the character with which the invention is concerned. Since such apparatus is well known and outside the scope of the claims herein, further description of such is deemed unnecessary.

The supply reel 10 comprises a right circular cylinder 16 having a rigid surface and provided with conventional shaft means 18 which is carried in bearings 20 mounted on a truck 22. The truck is provided with track wheels 24 engageable with a guide rail 26 which extends parallel to (the axis of) the cylinder 16. A tongue 28 on the truck is releasably connected to a traversing mechanism 30 by which the reel 10 is moved to and fro transversely of the direction of travel of the strip being wound thereon. A windup drive unit is situated on a platform 31 of the traversing mechanism and includes a splined coupling 33 releasably connectable to the shaft means 18. The coupling includes a flexible element 35 fixed on the end of the windup shaft 37 which is mounted in the bearings 39 secured to the platform. A conventional gear motor 41 or equal is connected by a flexible drive 43 to the shaft 37 to rotate the cylinder 16.

Referring also to FIG. 5, the traversing unit 30 includes a screw 45, parallel to the cylinder 16, and mounted rotatably in bearings fixed on the platform. The screw is threaded in a nut 47 fixed with respect to the floor in such a manner that the platform 31, and the truck 22 while connected to the platform, move in response to rotation of the screw. The screw 45 is connected to the shaft 37 by two flexible drives 50,52 of the chain and sprocket type each of which is connected to or disengaged from the shaft by a conventional clutch 54,56 thereby providing a reversing drive to the screw. The two clutches are operated in response to limit switches 58,60 by which the extremities of the traversing movement are determined in a conventional manner.

An optional but preferred speed ratio selector 62 is connected between the shaft 37 and the flexible drives to provide for convenient change of speed ratio of the screw 45 relative to the cylinder 16. By selecting a higher gear ratio in the selector 62, the screw 45 is made to rotate faster, relative to the cylinder, thus increasing the axial movement of the cylinder for each revolution of the cylinder and thereby increase the helical lead to accommodate a wider strip, for example, a sidewall strip. By selecting a lower ratio in the selector 62, the revolutions of the screw for each revolution of the cylinder are decreased, so as to provide a short lead accommodating a more narrow strip such as a chafer or chipper.

To load the cylinder, the strip S is delivered from the preparing apparatus 12 by way of a conventional tensioning and guiding device illustrated by the dance roll 63 and the two fixed support rolls 65,67 and thence led over a combining roll 70.

At the combining roll 70, the strip S is placed face-to-face with a separator cloth C to prevent successive turns of the strip S on the reel 10 from sticking to each other. The cloth C is supplied from a conventional let-off spool 72 as a running length and from one to two or more times as wide as the strip S. The strip S and the cloth C are led from the combining roll to the supply reel cylinder and are wound thereabout by rotation of the cylinder while the cylinder is, in timed relation with the rotation thereof, traversed to and fro in a direction parallel to the axis of the cylinder and normal to the direction of movement of the two strips.

The strip supply is wound on the surface of the cylinder in a series of helical turns from its initial point of contact first to a location approximately at the end of the cylinder where, in response to the action of the limit switches and the appropriate clutch, the traversing motion is stopped and then reversed in direction while the rotation of the cylinder continues. The strip continues to be wound in a second layer in which the hand or lead of the helix is reversed and the strip forms a next layer extending approximately to the opposite end of the cylinder whereat the associated limit switches and the other clutch are actuated to reverse again the direction of traverse. This sequence is repeated to load the supply reel with the requisite length of the strip S.

Having been filled as described, the truck 22 is disconnected both at the coupling 33 and at the tongue 28 from the traversing mechanism 30. The supply reel is then moved into association with the tire building machine 14 as illustrated in FIGS. 3 and 4. The tongue 28 is then connected to the platform 78 of a second traversing mechanism 80 and the shaft means 18 connected by the coupling 82 of the unwinding shaft 84. The shaft 84 is mounted on suitable bearings 86 fixed on the platform 78. A conventional brake 88 cooperates with a brake disc 91 fixed on the shaft 84 to provide a suitable back tension in the strip S as the same is delivered to the tire building machine 14.

The second traversing mechanism 80 includes a hydraulic cylinder 93 extending parallel to the unwind shaft to and to (the axis of) the cylinder 16 and is fixed with respect to the operating floor. The piston 94 and rod 95 of the hydraulic cylinder 93 are connected to a suitable bracket 96 on the platform 78. Hydraulic fluid from a conventional hydraulic power package (not shown) operates under the control of a conventional control valve 97 to move the traversing mechanism 80 and the supply reel 10 transversely with respect to the direction of movement of the strip S to the tire building machine 14.

The strip S together with the cloth C is led through a conventional lateral displacement sensing means 100 to the turning roll 102 whereat the cloth C diverges from the strip S and is led to a winding core 104. The winding core is rotated by driving means so as to pull the cloth from the reel 10. From the roll 102 the strip S is led by way of conventional tension and guide means 105 to the tire on the tire building machine 14.

In operation, as the cloth C and strip S are pulled from the supply reel 10, the lateral displacement of the strip S resulting from the helical angle thereof on the supply reel causes the strip to be gradually displaced laterally, that is transversely of the desired alignment with the tire. The lateral displacement sensing means 100 thereupon generates a signal which is communicated to the control valve 97. The control valve thereupon adjusts the effective pressure at one side or the other of the piston 94 in the hydraulic cylinder 93 sufficiently to cause the traversing mechanism to move the supply reel 10 to correct the alignment of the strip with the tire building machine. The correction effected is, practically, continuous, thus keeping the reel 10 in appropriate alignment as the strip is delivered to the drum.

It will be apparent to persons skilled in the art that numerous traversing mechanisms available in the art could be substituted for those described herein. Moreover, the applicant acknowledges that the helical winding of elongate material is well known. However, despite advantages now found in the practice of the invention, helical winding, sometimes called level winding, has not been applied as has been described herein, due to the nature and the shape of the strip components peculiar to tire making. These are uniformly tacky, readily subject to plastic deformation, and difficult to handle and contrary to the commonly known level winding of yarn, cable, thread, and the like do not have cross-sections of uniform equal dimensions, but must be wound or unwound without twisting about their length.

The present invention provides greatly increased capacity in each cylinder of the strip supply reels, allowing more tires to be built from a single supply reel with significantly less interruption of the building operation for resupply and less interruption of the operation of preparation of the strip. A further advantage is a significant reduction in floor space required for material in process inventories and a significant reduction in the time and cost in transporting such material. The strip is much less subject to damage, first because the supply is more stable than any supply roll wound straight on, that is, in a plane normal to the axis of the roll.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for building tires comprising supply reel means for receiving a tacky uncured strip of tire building component therearound and for delivering said strip to a tire building machine, said means including a cylinder mounted for rotation on a wheeled truck, drive means for rotating said cylinder in a first rotational sense for receiving said strip for winding therearound, means for continuously placing a separator cloth in face-to-face contact across said width of said strip as the strip is wound about the cylinder such that the width of the strip lies parallel to the cylinder, first traversing means drivingly connected with said drive means for traversing said cylinder axially to and fro for causing said strip and said cloth together free of twist therein to wrap said cylinder in a succession of continuous helical layers extending from near one end to near the other end of said cylinder in alternating axial directions, and track means for guiding said reel means for movement axially of said cylinder, second traversing means operably associated with a tire building machine for delivering said strip from said reel means, sensing means associated with said building machine for sensing lateral displacement of said strip relatively of said building machine, and control means responsive to said displacement of said strip relative to said tire building machine while said strip is being delivered to said machine and operable to control said second traversing means to minimize said displacement.

2. A method of building a tire comprising winding a running length of a strip of tacky tire building material about a supply reel, and while maintaining said strip free of twist traversing said reel axially to and fro to form a successive plurality of helical layers of alternating lead extending axially substantially from end to end of said reel, combining in face-to-face contact with said strip a separator cloth while winding said strip so as to wind said strip and said cloth convolutely together on said supply reel, and then delivering said strip from said supply reel to a tire building machine for winding said strip therearound and while delivering said strip to said tire machine, traversing said reel axially parallel to the axis of said machine to deliver said strip free of twist in a plane normal to the axis of said machine to incorporate said strip in said tire.

3. The method of making tires comprising attaching the leading end of a running length of a tacky narrow strip of a tire building component to a tire building drum or to a tacky tire component previously wound about said drum, rotating said drum to wind said strip therearound while concurrently pulling said strip and a cloth together in continuous face-to-face contact free of twist from a supply reel said reel having a continuous plurality of helical convolutions of said strip and said cloth in untwisted face-to-face contact and in successive layers of alternating opposite helical lead, separating said cloth from said strip after the cloth and the strip leave said reel and before said strip reaches said drum, and traversing said reel to and fro parallel to its own rotation axis through successive axial distances corresponding respectively to the axial lengths of the respective layers on said reel as said strip and said cloth are pulled from said reel so as to deliver said component to said drum in appropriate alignment therewith.

4. A tire building apparatus comprising rotatable tire building drum means for winding tire building components therearound to build a tire, supply means for receiving and dispensing to said drum means an untwisted running length of a narrow, tacky, tire building strip including an elongated cylinder having said strip wound thereon in a plurality of helical convolutions in successive layers of alternating opposite helical lead, means for preventing the tacky surfaces of said strip from sticking to each other and for separating said convolutions and said layers, said means for preventing comprising a running length of narrow cloth of width corresponding to the width of the strip in continuous twist-free, face-to-face contact with said strip, means for pulling said strip and said cloth from said cylinder in a direction perpendicular to the axis of the cylinder including rotatably driven core means for winding said cloth thereon, a plurality of traversing means for reciprocally traversing said cylinder parallel its own length to and fro successive distances corresponding respectively to the axial lengths of the respective said layers, said supply means including means for receiving said strip and said cloth together without twist helically about said cylinder in successive layers of alternately opposite helical lead, including means guiding said strip approaching said cylinder in a plane normal to the axis of said cylinder, one of said traversing means being fixed relative to said tire building drum means for winding said strip thereon to reciprocate said cylinder parallel to the rotation axis of said drum means.

5. A tire building apparatus as claimed in claim 4, said means for receiving said strip further comprising drive means for rotating said cylinder in timed relation with said one of said traversing means, and speed ratio means operable to change said timed relation between said drive means and said one of said traversing means whereby the respective leads of said helical convolutions can be changed to suit the width of said narrow strip.

* * * * *